United States Patent [19]

Brown

[11] Patent Number: 4,488,841
[45] Date of Patent: Dec. 18, 1984

[54] APPARATUS FOR MACHINING WORKPIECES TO A PREDETERMINED SHAPE

[76] Inventor: William A. Brown, 9 Jasper Crescent, Bramalea, Ontario, Canada

[21] Appl. No.: 384,182

[22] Filed: Jun. 2, 1982

[51] Int. Cl.³ .............................. B23D 1/20; B23B 3/28
[52] U.S. Cl. ........................................ 409/292; 82/18; 408/54; 409/289
[58] Field of Search ............... 82/1.3, 18, 19, 2 R; 409/289, 292, 321; 408/54; 29/565

[56] References Cited

U.S. PATENT DOCUMENTS

| | | | |
|---|---|---|---|
| 1,931,157 | 10/1933 | Bickel | 82/18 |
| 3,958,471 | 5/1976 | Muller | 82/1 C |
| 4,141,278 | 2/1979 | Lieser | 409/65 |
| 4,204,442 | 5/1980 | Nomura | 82/18 |

Primary Examiner—William R. Briggs
Assistant Examiner—Lawrence H. Meier
Attorney, Agent, or Firm—Ridout & Maybee

[57] ABSTRACT

An apparatus for machining a workpiece to a predetermined contour in accordance with a reference pattern comprises a cam mechanism which defines the reference pattern. The cam mechanism is mounted on a carrier assembly, on which is mounted a rotary workpiece holder for positioning a workpiece in relation to a machining tool. The cam mechanism is coupled to the workpiece holder by drive means and is driven so as to impart an oscillatory pivotal movement to the workpiece holder while rotating the workpiece holder, thereby effecting a predetermined pattern of movement of the workpiece in relation to the tool.

15 Claims, 11 Drawing Figures

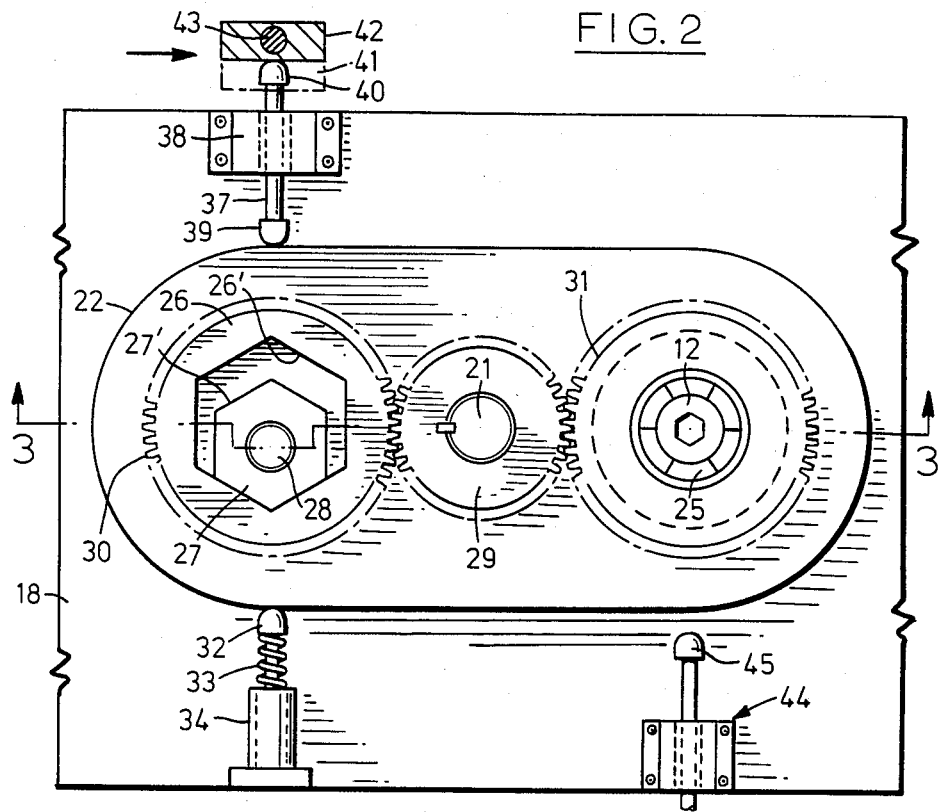
FIG. 2
FIG. 2a
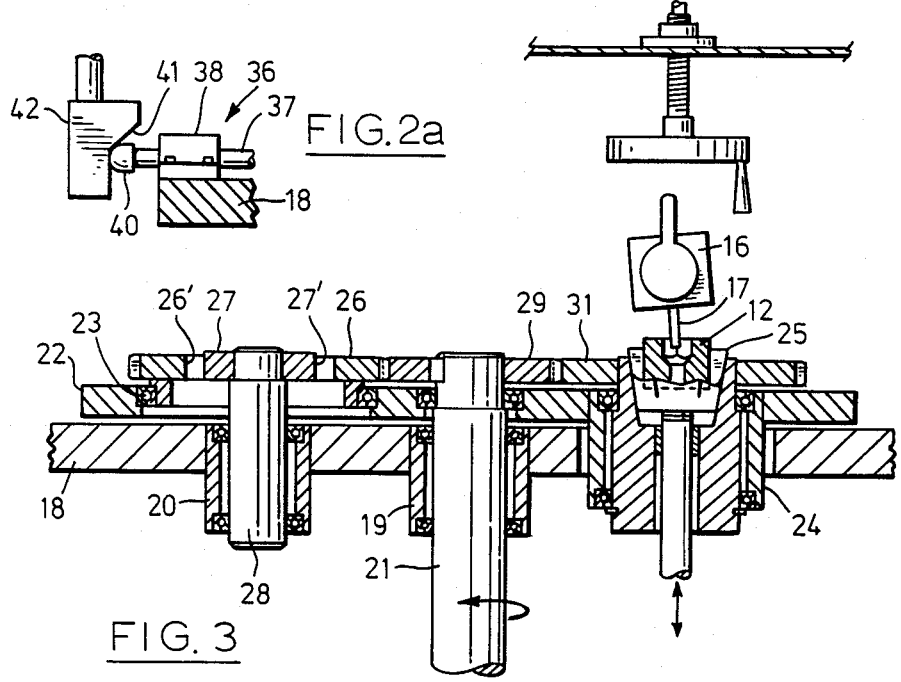
FIG. 3

APPARATUS FOR MACHINING WORKPIECES TO A PREDETERMINED SHAPE

FIELD OF THE INVENTION

This invention relates to apparatus for machining workpieces to a predetermined contour in accordance with a reference pattern. Such apparatus may be used to machine internal and external surfaces of a polygonal or other non-circular contour, and is especially suitable for the machining dies used in the casting of hexagonal bolt heads, more particularly domed bolt heads wherein a hexagonal rim merges into the domed surface of the head.

SUMMARY OF THE INVENTION

An apparatus according to the invention for machining workpieces to a predetermined contour in accordance with a reference pattern comprises a support structure, a first carrier mounted thereon, said first carrier including means defining first and second axes lying parallel to one another, a second carrier mounted on the first carrier for pivotal movement about said first axis, the second carrier including means defining third and fourth axes lying parallel to the first and second axes, a cam mechanism defining said reference pattern, the cam mechanism comprising a first cam member mounted on the second carrier for rotation about said third axis, and a second cam member mounted on the first carrier for rotation about said second axis, means biasing the second carrier in one direction to urge said cam members into cooperative interengagement whereby oscillatory pivotal movement of the second carrier is produced in response to rotation of the interengaging cam members about their respective axes, a workpiece holder mounted on the second carrier for rotation about said fourth axis, drive means interconnecting the first cam member with the workpiece holder for rotating the workpiece holder in synchronism with the first cam member, and means for mounting a machining tool in operative relationship to a workpiece mounted in the workpiece holder.

In one embodiment of the invention the first carrier is stationarily mounted with respect to the support structure. In another embodiment having a plurality of workpiece holders mounted on the second carrier for rotation about respective axes, the first carrier is rotatably mounted on the support structure for rotation about said first axis so that it may be indexed to bring the workholders sequentially to the work station or to a selected workstation. Preferably the apparatus provides a plurality of tool holders for mounting the machining tools ranging from coarse to fine at successive work stations, the workpiece or each workpiece being moved to the successive work stations in sequence.

BRIEF DESCRIPTION OF THE DRAWINGS

In order that the invention may be readily understood, two preferred embodiments thereof will now be described by way of example with reference to the accompanying drawings, in which:

FIG. 2 is a plan view of part of the apparatus shown in FIG. 1;

FIG. 2a is a fragmentary side elevational view of a detail shown in FIG. 2;

FIG. 3 is a sectional elevation taken on line 3—3 in FIG. 2;

DESCRIPTION OF THE PREFERRED EMBODIMENTS

Figure 1:
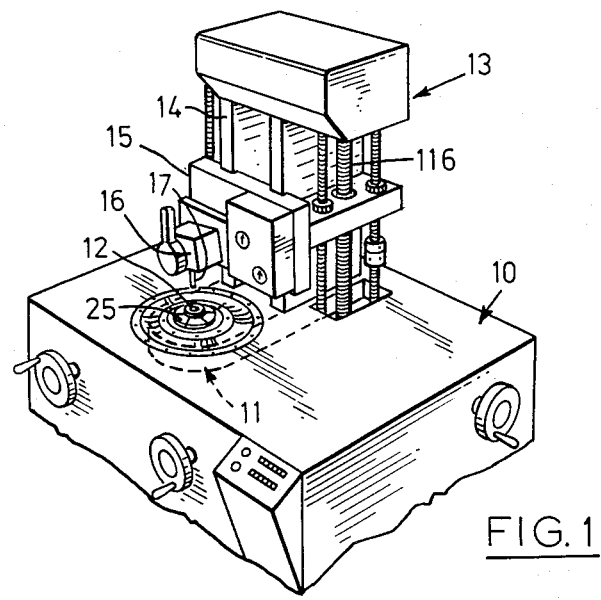
FIG. 1 is a perspective view of one apparatus in accordance with the invention.

As illustrated in the drawings the apparatus is designed primarily for machining the cavities of dies used in the casting of hexagonal bolts having domed heads, wherein the internal surface of the die cavity has a first portion of hexagonal contour which merges smoothly into a second portion of generally spherical contour which defines the domed shape of the bolt head. However, it is to be understood that by appropriate selection of the reference pattern the apparatus may be used to machine surfaces of other polygonal or non-circular contour.

Referring to FIG. 1, the apparatus comprises a main housing 10 providing a support structure, on which is mounted a mechanism 11 for holding and controlling the movements of a workpiece 12 to be machined, and a tool column 13. The column 13 provides a vertical slide 14 for a tool carriage 15, the latter supporting a tool holder 16 for positioning a machining tool in operative relationship to the workpiece 12. The tool carriage 15 can be moved vertically along the slide 14 by conventional drive means comprising a lead screw 116 for positioning the tool 17 vertically in relation to the workpiece 12. The tool holder 16 can also be moved horizontally in relation to the carriage 15 by conventional drive means for positioning the tool 17 radially with respect to the axis of the workpiece.

The mechanism 11 for holding and controlling the movements of the workpiece is shown in greater detail in FIGS. 2 and 3. This mechanism comprises a first carrier 18 in the form of a table which, in the present embodiment of the invention is stationarily mounted on the support structure and may be regarded as part of the support structure. The first carrier 18 is formed with circular openings which accommodate bearing assemblies, namely a first bearing assembly 19 which defines a first vertical axis, and a second bearing assembly 20 which defines a second vertical axis. A drive shaft 21 driven by a motor (not shown) is journalled in the first carrier for rotation about said first axis. A second carrier 22 mounted on the first carrier is journalled on the drive shaft 21 for pivotal movement about said first axis. The second carrier 22 is tablet-shaped and has a circular opening which accommodates a bearing assembly 23 which defines a third vertical axis of rotation. A second circular opening in the carrier 22 accommodates a bearing assembly 24 which defines a fourth axis of rotation, a workpiece holder in the form of a collet 25 being journalled in this last opening for rotation about said fourth axis. The second, third and fourth axes of rotation defined by the bearing assemblies 20, 23 and 24 are equidistant from the first axis, or drive axis.

The mechanism 11 includes a cam mechanism which, in operation of the apparatus, controls the movements of the workpiece in relation to the machining tool thereby defining a reference pattern which determines the contour of the finished workpiece. This cam mechanism comprises essentially a first cam member 26 which is journalled in the bearing assembly 23 for rotation about said third axis, and a second cam member 27 having a stub shaft 28 which is journalled in the bearing assembly 22 for rotation about said second axis. The cam members are constantly biased into cooperative interengagement as hereinafter described. The workpiece holder 25 is coupled to the drive shaft 21 and to the first cam member 26 by drive means comprising a drive gear 29 keyed to the upper end of the drive shaft for rotation therewith, a first driven gear 30 connected to the cam member 26 for rotation therewith, and a second driven gear 31 connected to the workpiece holder 25 for rotation therewith. For simplicity of illustration the gear 30 is shown in the drawings as being integral with the cam member 26, that is to say, the cam member 26 is shown as a disc having a toothed periphery constituting the driven gear 30, but the latter may alternatively be a separate element bolted or otherwise secured to the cam member. The driven gears 30 and 31 mesh with the drive gear 29 and have the same number of teeth so that the ratio of the driven gears is 1:1. In operation of the apparatus, the workpiece holder 24 is rotated by the drive means in synchronism with the first cam member 26 and in the same direction.

The cam member 26 has an internal cam edge 26' circumscribing the second cam member 27. In the present embodiment of the invention the cam edge 26' is defined by a concentric aperture of regular hexagonal shape; the second cam member 27 has an external cam edge 27' which is also of regular hexagonal shape. The dimensions of the cam edges are such as to permit a limited pivotal movement of the carrier 22 about its pivotal axis. In practice the shapes and dimensions of the cam edges 26', 27' must be chosen to suit the required contour of the workpiece, and for other required contours may be of other polygonal shapes and indeed other non-circular shapes.

The cam members are biased into cooperative relationship by a plunger 32 mounted on the fixed carrier 18 and bearing against the edge of the second carrier 22 for urging the latter clockwise about its pivotal axis. The plunger is loaded by a compression spring 33, the biasing force of which may be assisted by a hydraulic ram 34 which can be actuated as required. In practice it is necessary to provide for adjustment of this biasing force to compensate for variations in the pressure of engagement of the cam edges when machining metals of different hardness. In operation of the apparatus the workpiece holder 25 is rotated about its axis by the drive shaft 21, via the intermeshing gears 29, 31, causing the tool 17 to machine an internal profile in the workpiece 12. The first cam member 26 is also rotated by the drive shaft, via the intermeshing gears 29, 30 but the rotation of the cam member 26 is constrained by its engagement with the second cam member 27 which rotates about a fixed axis. In consequence the rotation of the first cam member subjects the carrier 22 to an oscillatory pivotal movement about its pivotal axis, this movement being transmitted to the workpiece holder 25. The locus of the machining tool 17 with respect to the workpiece is thus determined by the configuration of the interengaging cam members so that the workpiece is machined to a contour corresponding to a reference pattern defined by said cam members.

Figure 4:
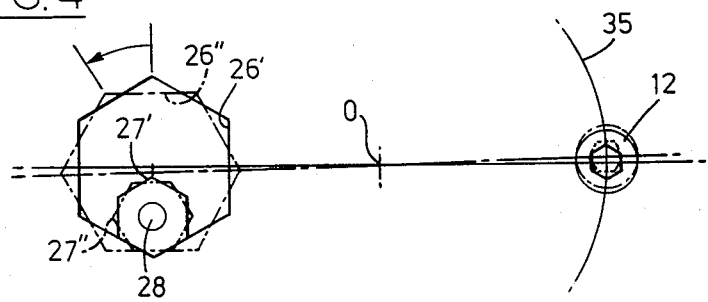
FIG. 4 shows diagrammatically the basic principle of operation of the apparatus.
Figures 5A, 5B, 5C, 5D:
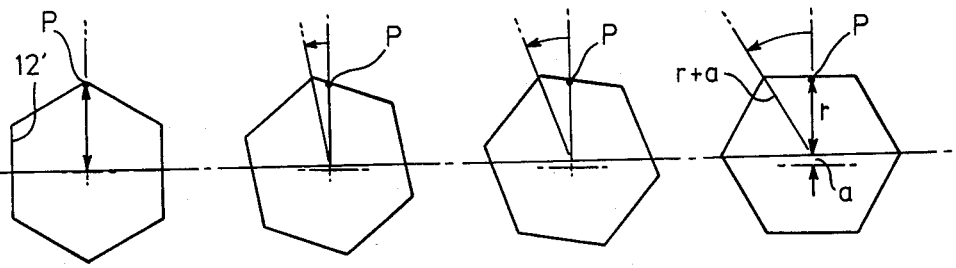
FIGS. 5a–5d are sequential diagrammatic views illustrating the machining of a workpiece.

FIG. 4 illustrates the movement of the workpiece 12 in response to rotation of the first cam member 26 through 30°, commencing with a cam configuration at which the carrier 22 is at one limit of its pivotal movement. The initial configuration of the interengaging cam edges is denoted by the continuous lines 26',27'. Rotation of the cam member 26 through 30° brings the cam edge 26' to the position denoted by the broken line 26", the second cam member also being rotated thereby to bring its edge to the position denoted by the broken line 27". The workpiece 12 is simultaneously rotated through 30°. However, this rotation of the interengaging cam members 26, 27 causes the carrier 22 to pivot about its pivotal axis 0, to the other limit of its pivotal movement, thus moving the axis of rotation of the workpiece 12 by a predetermined amount along the arc 35. Further rotation of the cam member 26 through 30°, accompanied by a corresponding rotation of the cam member 27 and the workpiece 12, completes the cycle of pivotal movement of the carrier 22, the tool 17 having machined one side of the hexagonal contour to be produced. The cycle is repeated for other sides of the hexagonal contour.

FIGS. 5a–5d illustrate corresponding movements of the workpiece in relation to the machining tool, the position of which is denoted by the fixed point P, while the workpiece is rotated through 30°. The contour to be machined is denoted by the reference numeral 12'. Pivotal movement of the carrier 22 causes the axis of the workpiece to move through a distance along the arc 35 (FIG. 4) thereby varying the distance of said axis from the tool between the limits r+a and r.

In order to machine a hexagonal profile of extended axial length it is of course necessary to advance the tool 17 progressively as the machining operation proceeds, and this is accomplished by the drive mechanism comprising the lead screw 116. However, the apparatus is adapted to provide for machining a surface profile which varies in the axial direction, for example a surface having a hexagonal profile which merges into a circular profile. This is accomplished by progressively reducing the oscillatory pivotal movement of the carrier 22 as the tool 17 is continuously advanced into the workpiece. For this purpose an adjustable stop 36 is mounted on the fixed carrier 18 (FIGS. 2 and 2a). The stop comprises a rod 37 which is slidable in a bearing 38 mounted on the carrier 18. The rod 37 carries an abutment member 39 which engages the edge of the carrier 22 at a selected limit of its pivotal movement, and an abutment 40 which engages the ramp 41 of a slide cam 42. The slide cam 42 is driven by a lead screw 43 in synchronism with the advance of the tool 17, thereby to advance the abutment member 39 and so progressively reduce the oscillatory pivotal movement of the carrier 22 until the cam members no longer interengage, at which point the axis of rotation of the workpiece will remain stationary.

In order to machine a cavity having a domed profile in the workpiece, it is necessary to reduce the diameter of the circular profile progressively as the tool is advanced. This is accomplished by moving the tool laterally towards the axis of the workpiece as the tool is advanced, by means of the conventional lateral drive mechanism for the tool holder 16 provided in the carriage 15.

For the purpose of machining a profile which does not vary in the axial direction a manually operable stop 44 is mounted on the first carrier 18, this stop having a plunger 45 which can be extended to bear against the edge of the carrier 22 to pivot the latter about its axis against the bias of the plunger 32, thereby to limit the oscillatory pivotal movement of the carrier 22. This manually adjustable stop 44 is also used to disengage the cam members to facilitate their replacement when necessary.

Figure 7:
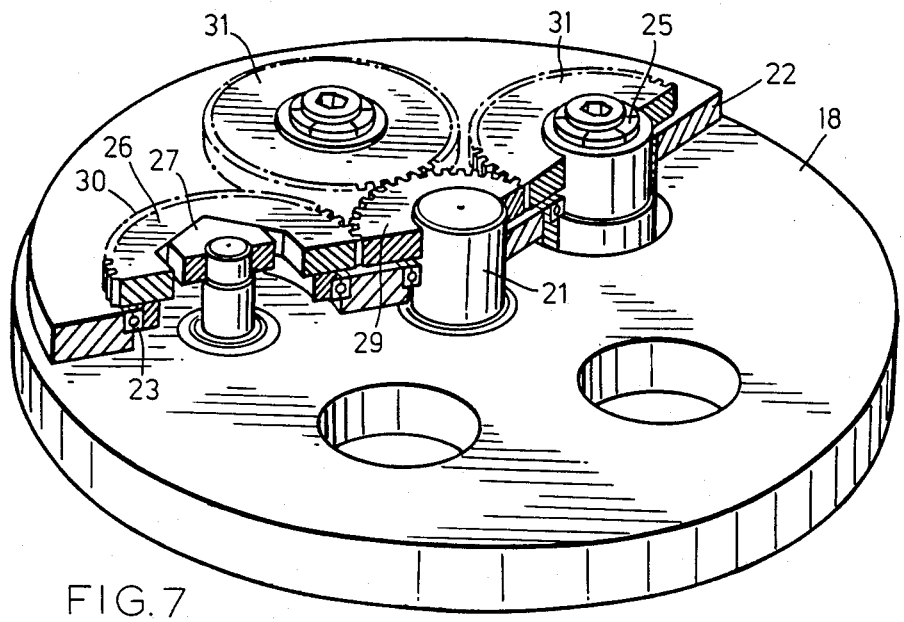
FIG. 7 is a perspective view of the detail shown in FIG. 6, partly cut away on the line 7—7 in FIG. 6.
Figure 6:
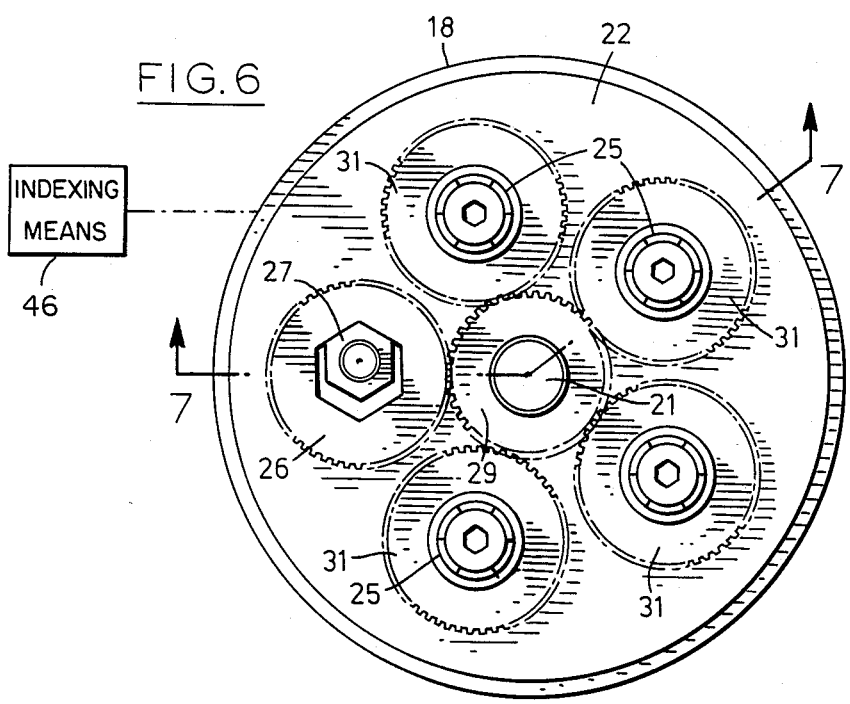
FIG. 6 is a plan view showing a detail of the second embodiment of the invention.

The second apparatus in accordance with the present invention is basically similar to the first and is not illustrated in full in the drawings. FIGS. 6 and 7 illustrate the parts of the second apparatus which differ from those of the first, but the same reference numerals are used to denote those parts which have corresponding functions. In this apparatus the first carrier 18 is in the form of a circular plate which is journalled on the drive shaft 21 and rotatably mounted on the stationary support structure. The carrier can be indexed about the central axis represented by the shaft 21 to bring a plurality of workpieces sequentially to a selected work station at which the machining takes place. For this purpose a suitable indexing mechanism 46 is coupled to the first carrier 18 and shown schematically in FIG. 6. The apparatus shown can accommodate four workpieces to be brought to the work station in this manner. The second carrier 22 is also journalled on the shaft 21 for pivotal movement about the central axis, and provides a ring of circular openings which accommodate bearings defining the respective axes of rotation of the first cam member 26 and the four workpiece holders 25. As in the first apparatus the first cam member 26 is connected to a gear 30 and the workpiece holders 25 are connected to gears 31; these gears mesh with the drive gear 22 so as to be driven thereby when the drive shaft is rotated. In operation of the apparatus the workpiece holders 25 are thus rotated in the same direction about their respective axes in synchronism with the first cam member 26. As in the first apparatus the cooperative interengagement of the first cam member 26 and the second cam member 27 imparts an oscillatory pivotal movement to the second carrier 22, thus defining the reference pattern, so that the workpiece at the selected work station is machined to the contour determined by the reference pattern. As previously mentioned, the workpieces can be brought sequentially to the work station.

An important feature of this arrangement is that all four workpiece holders are subjected simultaneously to the pattern of movement determined by the reference pattern. Accordingly, by providing the apparatus with four appropriately positioned work stations four workpieces can be machined simultaneously. Advantageously the apparatus would be provided with a number of tool columns corresponding to the column 13 (FIG. 1) for positioning the tools at the respective work stations, the tools ranging from coarse to fine. By indexing the first carrier after each machining operation each workpiece would be machined in the most efficient manner at the respective work stations in sequence.

Although the invention has been described with reference to the machining of an internal cavity in a workpiece, it will readily be appreciated by those skilled in the art that the invention is also applicable to the machining of an external profile on a workpiece. Furthermore, although the invention has been described with reference to the machining of a regular hexagonal profile, the profile is in fact determined by the configuration of the cam mechanism and by selecting differently configured cams one can use the apparatus to machine profiles of other polygonal and other non-circular shapes.

I claim:

1. Apparatus for machining a workpiece to a predetermined contour in accordance with a reference pattern comprising:
   a support structure,
   a first carrier mounted thereon, said first carrier including means defining first and second axes lying parallel to one another,
   a second carrier mounted on the first carrier for pivotal movement about said first axis, the second carrier including means defining third and fourth axes lying parallel to the first and second axes,
   a cam mechanism defining said reference pattern, the cam mechanism comprising a first cam member mounted on the second carrier for rotation about said third axis, and a second cam member mounted on the first carrier for rotation about said second axis,
   means biasing the second carrier in one direction to urge said cam members into cooperative interengagement whereby oscillatory pivotal movement of the second carrier is produced in response to rotation of the interengaging cam members about their respective axes,
   a workpiece holder mounted on the second carrier for rotation about said fouth axis,
   drive means interconnecting the first cam member with the workpiece holder for rotating the workpiece holder in synchronism with the first cam members, and,
   means for mounting a machining tool in operative relationship to a workpiece mounted in the workpiece holder.

2. Apparatus according to claim 1, wherein the first carrier is stationarily mounted with respect to the support structure.

3. Apparatus according to claim 1, wherein the first carrier is mounted for rotation about said first axis, the apparatus further comprising means for indexing the first carrier to bring the workpiece holder sequentially to successive machining positions.

4. Apparatus according to claim 1, wherein one said cam member provides an internal cam edge circumscribing the other cam member, said other cam member providing an external cam edge cooperating with said internal cam edge to define the reference pattern.

5. Apparatus according to claim 4, wherein said cam edges are of regular polygonal shape.

6. Apparatus according to claim 5, wherein said cam edges are of regular hexagonal shape.

7. Apparatus according to claim 4, wherein said biasing means comprises a spring loaded plunger mounted on said first carrier and bearing against said second carrier to urge the latter in one direction about said first axis.

8. Apparatus according to claim 7, wherein the biasing means further comprises a hydraulic ram engaging the plunger, the ram being selectively operable to augment the spring loading thereof.

9. Apparatus according to claim 4, further comprising means for limiting the oscillatory pivotal movement of said second carrier, said means comprising an adjustable stop and means for positioning the stop to engage said second carrier at the selected limit of pivotal movement thereof in said one direction.

10. Apparatus according to claim 9, including means for continuously advancing the stop towards said second carrier for progressively reducing the amplitude of said oscillatory pivotal movement during operation of the apparatus.

11. Apparatus according to claim 4, wherein said drive means comprises a drive shaft journalled in the first carrier for rotation about said first axis, a drive gear mounted on the drive shaft for rotation therewith, and first and second driven gears journalled in said second carrier for rotation about said third and fourth axes, respectively, the driven gears meshing with said drive gear and being connected to said first cam member and said workholder for rotating same about their respective axes in accordance with rotation of the drive shaft.

12. Apparatus according to claim 11, wherein the ratio of said first and second driven gears is 1:1.

13. Apparatus according to claim 4, including drive means coupled to the tool holder for continuously advancing the tool holder axially to bring the tool into machining engagement with the workpiece.

14. Apparatus according to claim 13, further comprising means for limiting the oscillatory pivotal movement of said second carrier, said limiting means comprising an adjustable stop and means for continuously advancing the stop towards said second carrier for progressively reducing the amplitude of said oscillatory pivotal movement of the second carrier, said stop advancing means being drivingly coupled to said drive means for advancing the tool holder whereby to reduce the oscillatory pivotal movement of the second carrier in accordance with the advance of the tool holder.

15. Apparatus according to claim 1, further comprising a plurality of workholders mounted on said second carrier for rotation about respective axes parallel to and equidistant from said first axis, said drive means interconnecting said first cam member with each of the workholders, and said first carrier being mounted on said support structure for rotation about said first axis for indexing the first carrier to bring the workholders sequentially to a work station.

* * * * *